US012633118B2

(12) United States Patent
Kido et al.

(10) Patent No.: US 12,633,118 B2
(45) Date of Patent: May 19, 2026

(54) INFORMATION PROCESSING DEVICE AND INFORMATION PROCESSING METHOD

(71) Applicant: HITACHI ASTEMO, LTD., Hitachinaka (JP)

(72) Inventors: Hideaki Kido, Tokyo (JP); Naoki Mori, Tokyo (JP); Takashi Nomura, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 294 days.

(21) Appl. No.: 18/548,998

(22) PCT Filed: Mar. 4, 2022

(86) PCT No.: PCT/JP2022/009319
§ 371 (c)(1),
(2) Date: Sep. 5, 2023

(87) PCT Pub. No.: WO2022/209573
PCT Pub. Date: Oct. 6, 2022

(65) Prior Publication Data
US 2024/0153266 A1     May 9, 2024

(30) Foreign Application Priority Data

Apr. 2, 2021     (JP) ................................. 2021-063499

(51) Int. Cl.
*G06V 20/10*          (2022.01)
*G01C 21/00*          (2006.01)
*G06V 10/74*          (2022.01)

(52) U.S. Cl.
CPC ....... *G06V 20/182* (2022.01); *G01C 21/3815* (2020.08); *G01C 21/3852* (2020.08); *G06V 10/761* (2022.01)

(58) Field of Classification Search
None
See application file for complete search history.

(56) References Cited

U.S. PATENT DOCUMENTS 10,685,566 B1 *   6/2020   Patel .................. G01C 21/1656
10,752,253 B1 *   8/2020   Nath .................... B60W 50/14
                        (Continued)

FOREIGN PATENT DOCUMENTS

CN          102341836 A        2/2012
JP          2007-128141 A      5/2007
                        (Continued)

OTHER PUBLICATIONS

International Search Report with English Translation and Written Opinion of International Patent Application No. PCT/JP2022/009319 dated May 24, 2022 (11 pages).

(Continued)

*Primary Examiner* — Anand P Bhatnagar
(74) *Attorney, Agent, or Firm* — Foley & Lardner LLP

(57)     ABSTRACT

An information processing device and an information processing method capable of appropriately handling a shielding region of a road are provided.

The information processing device includes a first information conversion unit 15 that estimates a first road region from an image obtained by imaging the road, a second information conversion unit 17 that estimates a second road region from map information stored in a map information storage unit 11, and a difference extraction unit 16 that extracts difference information representing a difference between the first road region and the second road region. Further, in the information processing method, a computer estimates the first road region from the image obtained by imaging the road, estimates the second road region from the map infor- (Continued)

INFORMATION PROCESSING UNIT mation, and extracts the difference information indicating the difference between the first road region and the second road region.

7 Claims, 11 Drawing Sheets

(56)                    References Cited

U.S. PATENT DOCUMENTS

| | | | |
|---|---|---|---|
| 10,760,920 | B2 * | 9/2020 | Sekiyama ............. G06T 11/203 |
| 11,105,638 | B2 * | 8/2021 | Jin ........................ G05D 1/0251 |
| 11,175,661 | B2 * | 11/2021 | Satake ............ B60W 60/00186 |
| 11,227,168 | B2 * | 1/2022 | Wang ...................... G01C 21/28 |
| 11,512,965 | B2 * | 11/2022 | Kawabata .......... G01C 21/3815 |
| 11,852,491 | B2 * | 12/2023 | Takahama ........... B60W 60/001 |
| 11,908,163 | B2 * | 2/2024 | Qian ........................ G06T 7/521 |
| 2011/0276263 | A1 | 11/2011 | Shimotani et al. |
| 2013/0243339 | A1 | 9/2013 | Fujiwara et al. |
| 2020/0064138 | A1 * | 2/2020 | Takahama .............. G01C 21/30 |
| 2020/0265246 | A1 | 8/2020 | Machii et al. |
| 2020/0278210 | A1 | 9/2020 | Nomura |
| 2022/0082407 | A1 | 3/2022 | Shiota et al. |
| 2023/0236037 | A1 * | 7/2023 | Heilbron .............. G08G 1/0133 |
| | | | 701/422 |

FOREIGN PATENT DOCUMENTS

| | | | |
|---|---|---|---|
| JP | 2009-176163 | A | 8/2009 |
| JP | 4799709 | B2 | 10/2011 |
| JP | 2013-186464 | A | 9/2013 |
| JP | 2017-090239 | A | 5/2017 |
| JP | 6197393 | B2 | 9/2017 |
| JP | 2019-067159 | A | 4/2019 |
| JP | 2019-101256 | A | 6/2019 |
| JP | 2019-168514 | A | 10/2019 |
| JP | 2020-160291 | A | 10/2020 |
| JP | 2020-197708 | A | 12/2020 |
| WO | WO-2010/100698 | A1 | 9/2010 |
| WO | WO-2018/094475 | A1 | 5/2018 |

OTHER PUBLICATIONS

Chinese Office Action issued in corresponding CN Application No. 202280016954.4 dated Sep. 11, 2025 with English translation (19 pages).

* cited by examiner

INFORMATION PROCESSING UNIT

FIG. 6

| | 1 ROAD EXISTS | 2 ROAD EXISTS | DIFFERENCE PRESENCE-ABSENCE RELIABILITY | DIFFERENCE AMOUNT RELIABILITY |
|---|---|---|---|---|
| A | EXISTS | | MIDDLE | MIDDLE |
| B1 | | EXISTS | LOW | LOW |
| B0 | | EXISTS | HIGH | HIGH |
| C1 | EXISTS | EXISTS | LOW | LOW |
| C0 | EXISTS | EXISTS | HIGH | HIGH |
| D1 | EXISTS | EXISTS | HIGH | LOW |
| D0 | EXISTS | EXISTS | HIGH | HIGH |
| E1 | EXISTS | EXISTS | LOW | — |
| E0 | EXISTS | EXISTS | HIGH | — |
| F | | | HIGH | — |

FIG. 9

| | 1 ROAD EXISTS | 2 ROAD EXISTS | DIFFERENCE PRESENCE-ABSENCE RELIABILITY | DIFFERENCE AMOUNT RELIABILITY |
|---|---|---|---|---|
| A1 | EXISTS | | MIDDLE | LOW |
| A0 | EXISTS | | MIDDLE | MIDDLE |
| B3,B2 | | EXISTS | LOW | LOW |
| B1 | | EXISTS | LOW | LOW |
| B0 | | EXISTS | HIGH | HIGH |
| C1,C2,C3 | EXISTS | EXISTS | LOW | LOW |
| C0 | EXISTS | EXISTS | HIGH | HIGH |
| D1,D2,D3 | EXISTS | EXISTS | HIGH | LOW |
| D0 | EXISTS | EXISTS | HIGH | HIGH |
| E1,E2,E3 | EXISTS | EXISTS | LOW | — |
| E0 | EXISTS | EXISTS | HIGH | — |
| F1 | | | MIDDLE | — |
| F0 | | | HIGH | — |

INFORMATION PROCESSING DEVICE AND INFORMATION PROCESSING METHOD

TECHNICAL FIELD

The present invention relates to an information processing device and an information processing method. For example, the present disclosure relates to the information processing device and the information processing method that handle map data for automatic driving and an advanced safety driving system.

BACKGROUND ART

A method for collecting road information by a map generation vehicle or manpower and constructing a highly accurate map for a map that holds road or lane information in a network shape is known for the automatic driving and driving assistance. In this method, because a considerable amount of human labor is generated, only information about a part of the road such as an expressway can be constructed, and there are problems that completeness of the constructed map information is reduced and that a range in which the map can be provided for automatic driving and driving assistance is narrowed.

For this problem, for example, PTL 1 discloses a method for updating the map using data collected from an imaging device mounted on a general vehicle. PTL 2 discloses a technique for enhancing the accuracy of the map using an aerial photograph and navigation map data. Furthermore, PTL 3 discloses a map correction method using aerial photograph data and substrate road map data.

CITATION LIST

Patent Literatures

PTL 1: Japanese Patent No. 6197393
PTL 2: Japanese Patent No. 4799709
PTL 3: JP 2019-101256 A

SUMMARY OF INVENTION

Technical Problem

However, the conventional technique has a problem that a shielding region that does not appear in the image because the road is shielded cannot be appropriately handled.

The shielded region where the road is shielded by a tunnel, an overhead crossing, high-rise buildings, and the like exists in the aerial photograph, a satellite image, and the image captured by the imaging device mounted on the general vehicle. For this reason, when road information extracted based on the captured image is reflected on the map, there is a problem that wrong information is reflected.

The present invention has been made to solve such a problem, and an object of the present invention is to provide an information processing device and an information processing method capable of appropriately handling the shielding region of the road.

Solution to Problem

An example of an information processing device includes: a first information conversion unit that estimates a first road region from an image obtained by imaging a road;

a second information conversion unit that estimates a second road region from map information stored in a map information storage unit; and
a difference extraction unit that extracts difference information indicating a difference between the first road region and the second road region.

An example of an information processing method in which a computer:
estimates a first road region from an image obtained by imaging a road;
estimates a second road region from map information; and
extracts difference information indicating a difference between the first road region and the second road region.

The present specification includes the disclosure of Japanese Patent Application No. 2021-063499 on which priority of the present application is based.

Advantageous Effects of Invention

The information processing device and the information processing method according to the present invention can appropriately handle the shielding region of the road.

BRIEF DESCRIPTION OF DRAWINGS

FIG. 6 is a view illustrating a relationship between difference information and reliability according to a configuration in FIG. 5.
FIG. 9 is a view illustrating a relationship between difference information and reliability according to a configuration in FIG. 8.

DESCRIPTION OF EMBODIMENT

Hereinafter, an embodiment of the present invention will be described with reference to the accompanying drawings.

First Embodiment

Figure 1:
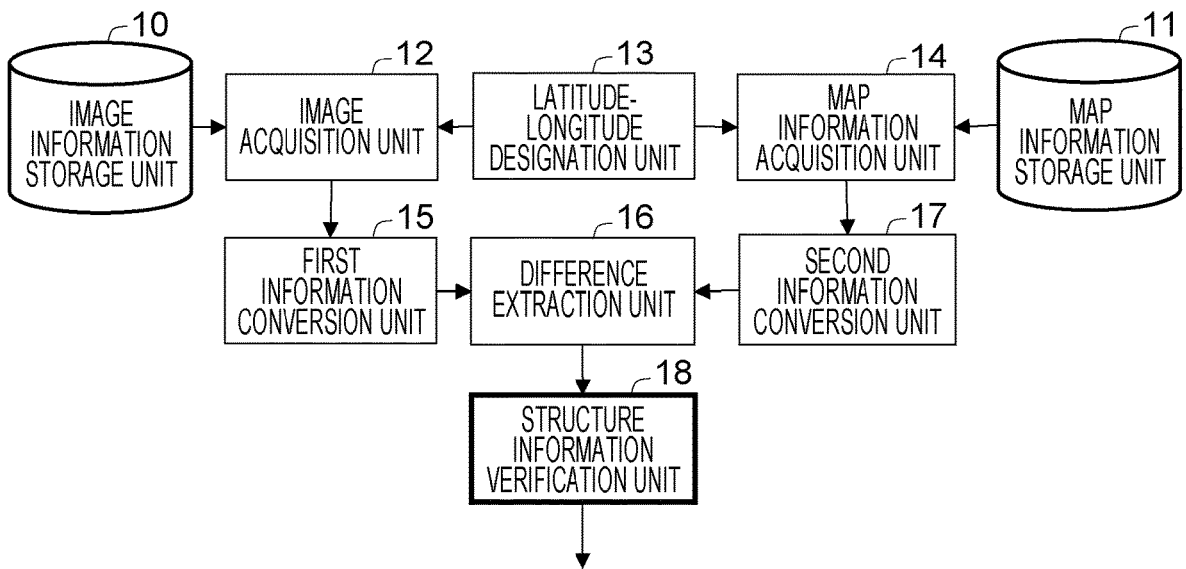
FIG. 1 is a view illustrating a basic configuration of an information processing device.

FIG. 1 illustrates a configuration of an information processing device according to a first embodiment. The information processing device executes an information processing method described in the present specification.

An image acquisition unit 12 acquires a satellite image or an aerial image belonging to a range designated by a latitude-longitude designation unit 13 from an image information storage unit 10 that stores the satellite image or an aerial photograph. At this point, for example, the satellite image is obtained by capturing an image of a ground from a camera mounted on a satellite, acquiring the image, and restoring data of the ground as if overlooking the data. In addition, for example, the aerial image is the image of the ground captured by the camera mounted on an aircraft, acquired, and restored as if the data of the ground is overlooked.

The latitude-longitude designation unit 13 may designate the latitude and longitude such that an image to be acquired is extracted, or substitute the latitude and longitude with an identifier or the like that substitutes the latitude and longitude.

A first information conversion unit 15 estimates a road region (first road region) from the image obtained by imaging the road. For example, processing is performed on the satellite image or the aerial image acquired by the image acquisition unit 12 to estimate the road region. The first road region may be represented as the image.

For example, the road region is estimated as an attribute given to each pixel of the image, and includes information indicating whether each pixel is the road. This information can be represented as the image. Alternatively, the road region may be extracted in a network shape represented by nodes and links, and in this case, the extracted information may be represented by a set of pixels.

A map information acquisition unit 14 acquires map information (for example, information in a network format) of a region designated by the latitude-longitude designation unit 13 from a map information storage unit 11.

A second information conversion unit 17 estimates a road region (second road region) from the map information stored in the map information storage unit 11. For example, data having the same format as that output by the first information conversion unit 15 is output. That is, when the first information conversion unit 15 outputs the image, the second information conversion unit 17 also generates the image indicating the road region. When the first information conversion unit 15 outputs the data in the network format, the second information conversion unit 17 also outputs the data in the network format.

A difference extraction unit 16 extracts difference information representing a difference between the two road regions (the first road region and the second road region).

A structure information verification unit 18 verifies a structure regarding the road based on the extracted difference information, and outputs a result. In the following description, unless otherwise specified, it is assumed that the forms output from the first information conversion unit 15 and the second information conversion unit 17 are images, but the outputs of the first information conversion unit 15 and the second information conversion unit 17 may be in the network shape. The difference extraction unit 16 may compare images with each other or compare networks with each other.

For example, the information processing device in FIG. 1 can be configured using a known computer. For example, the information processing device includes arithmetic means and storage means. For example, the arithmetic means includes a processor, and the storage means includes a storage medium such as a semiconductor memory device and a magnetic disk device.

In addition, the computer may include input/output means. For example, the input/output means includes an input device such as a keyboard and a mouse, an output device such as a display and a printer, and a communication device such as a network interface.

The storage means may store a program. The computer may perform functions described in the embodiment by a processor executing the program. That is, the computer functions as each component in FIG. 1, thereby operating as the information processing device, namely, executing the information processing method.

Figure 2:
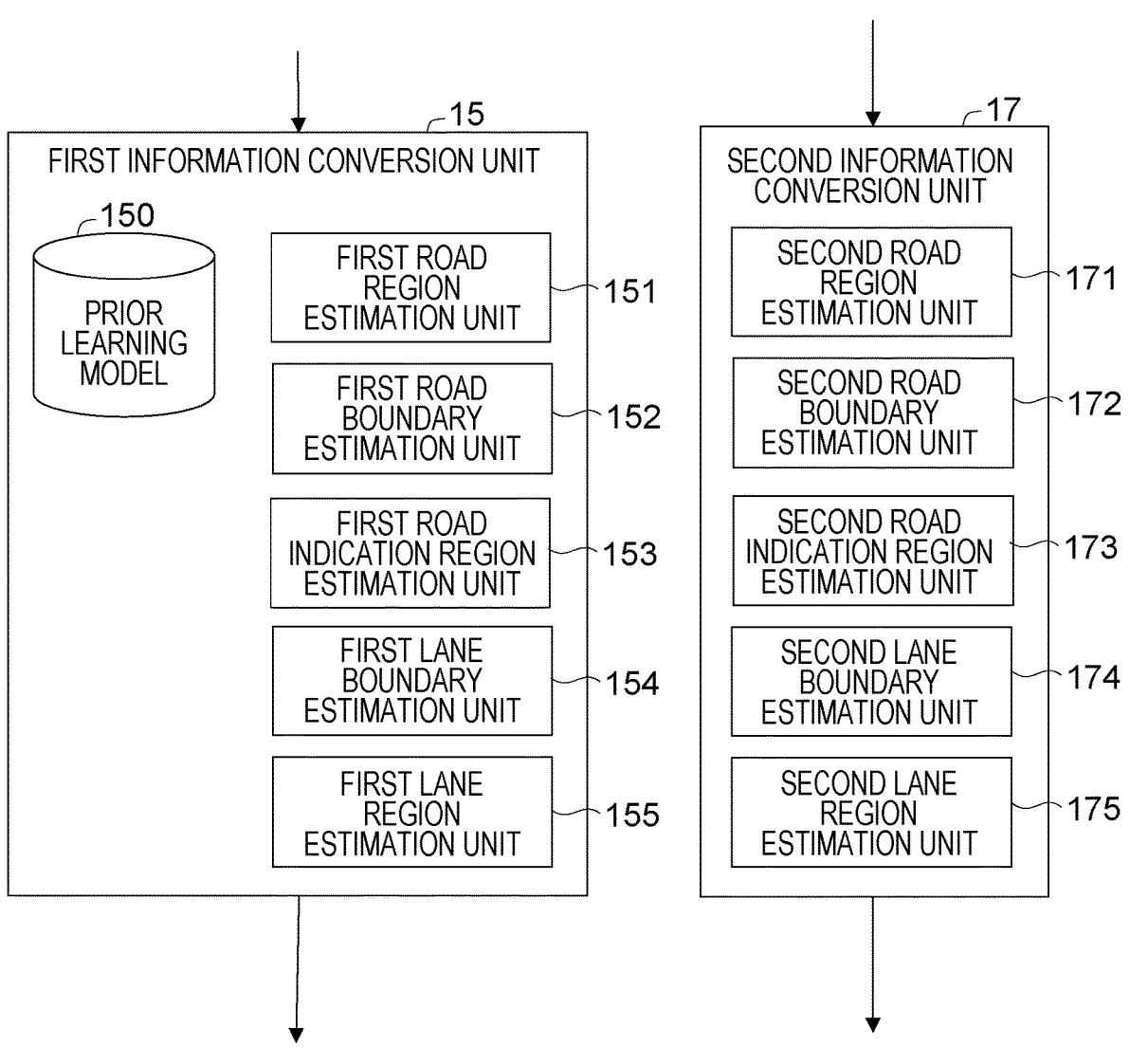
FIG. 2 is a view illustrating an information conversion unit.

FIG. 2 illustrates configurations of the first information conversion unit 15 and the second information conversion unit 17. The first information conversion unit 15 uses the image acquired by the image acquisition unit 12 as the input to estimate whether the image is, for example, the road region for each pixel of the image. At this point, for example, the estimation can be performed by a semantic segmentation technique or the like using a prior learning model 150 such as a neural network previously learned by machine learning.

In the following description, the term "road" is a generic term for a road including a single lane and a road including a plurality of lanes. For example, the entire road including the plurality of lanes may be processed as one road, or be processed as a plurality of parallel roads.

The estimation of the road region is performed by a first road region estimation unit 151. In addition, the first information conversion unit 15 may include a first road boundary estimation unit 152 that estimates a boundary between a road and a road or between a road and a non-road, or include a first road indication region estimation unit 153 that estimates a white line, a yellow line, a zebra zone, or the like. The first information conversion unit 15 may include a first lane boundary estimation unit 154 and/or a first lane region estimation unit 155 that divides the road region for each lane to estimate the road region together with the boundary of the lane in order to estimate more detailed information.

For example, the map information storage unit 11 stores road data included in map data for navigation. In this data, a shape of the road is stored in the network shape, and for example, an element of the shape of the road is stored in a state representing a node, a link, the shape of the link, and the attribute of the road. For example, an edge of the road is represented as the node, and the road is represented as the link connecting two nodes. The link may be associated with information indicating the attribute of the road (for example, a width of the road or the lane).

Similarly to the first information conversion unit 15, in addition to a second road region estimation unit 171, the second information conversion unit 17 may include a second road boundary estimation unit 172 that estimates the boundary between the road and the non-road or the boundary between the road and another road, and include a second lane boundary estimation unit 174 and/or a second lane region estimation unit 175 that divides the road region for each lane to estimate the road region together with the boundary of the lane in order to estimate more detailed information. In more detail, when the map holds the yellow line, the white line information, and the like, the second information conversion unit 17 may include a second road indication region estimation unit 173.

For example, when given network information indicates a center line position of the road, the second road region estimation unit 171 can first convert the network information into information in an image format, and further widen pixels on both sides of the center line to estimate the road region. For example, the widening is performed by configuring a disk having a radius of half of the pixel corresponding to the lane width while considering the number of lanes for each pixel configuring the center line and superimposing the disks. For example, the number of pixels to be actually widened can be determined according to a distance per pixel of the image obtained by the first information conversion unit 15. When two parallel roads overlap each other at the time of widening, the center line of the overlapping region may be treated as the road boundary. A person skilled in the art can appropriately design processing in the case where there is a vertical relationship in altitude on the road (for example, a three-dimensional intersection), but for example, the road having a higher altitude may be preferentially widened.

Figure 4:
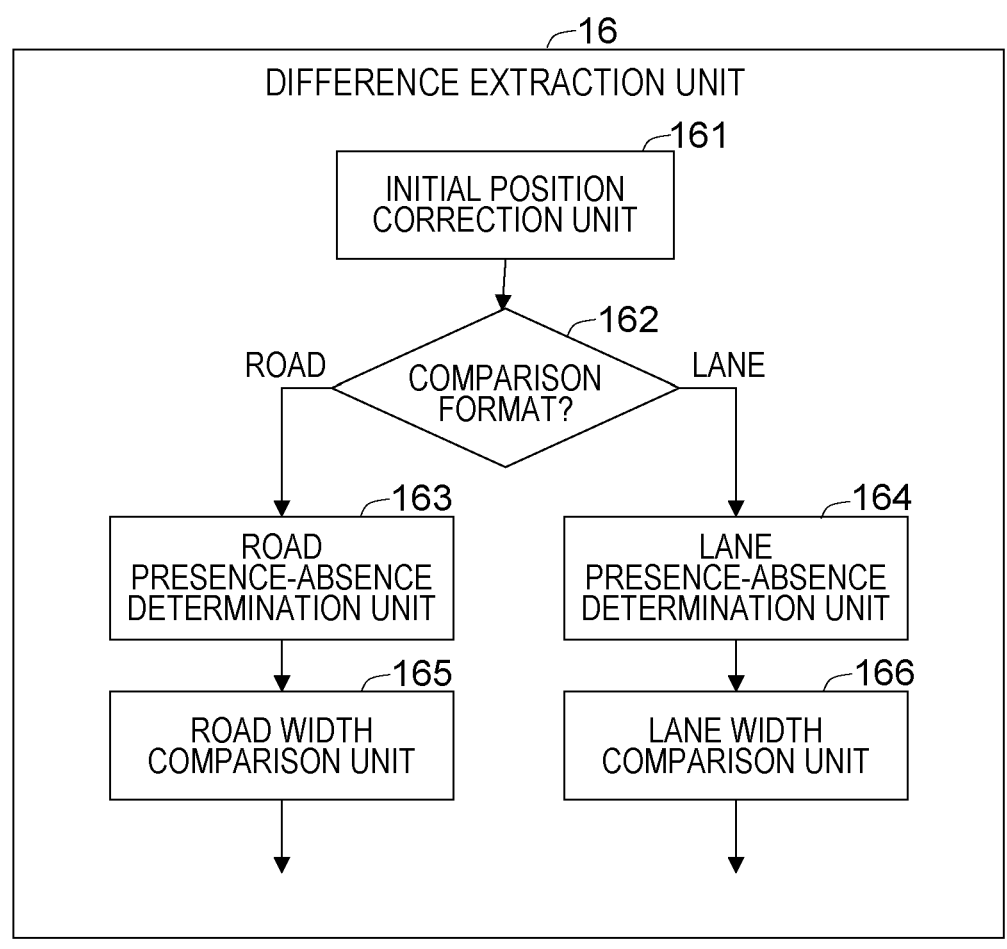
FIG. 4 is a view illustrating a difference extraction unit.

FIG. 4 illustrates the function of the difference extraction unit 16. In the embodiment, the results of the first road region estimation unit 151 and the second road region estimation unit 171 are used in the estimation units in FIG. 2. However, processing results of the first road boundary estimation unit 152 and the second road boundary estimation unit 172, the first road indication region estimation unit 153 and the second road indication region estimation unit 173, and the first lane boundary estimation unit 154 and the second lane boundary estimation unit 174 may also be used as information improving accuracy of difference extraction.

The difference extraction unit 16 extracts a difference between the images acquired from the first information conversion unit 15 and the second information conversion unit 17. In the images acquired from the two information conversion units, there is a possibility that the positions of the roads are shifted from each other due to distortion of the satellite image or the aerial photograph that is a source of the images or the shift of the position of the network of the map registered in the map information storage unit 11. For this reason, first an initial position correction unit 161 performs rough alignment between roads. Specific processing of the alignment between two images can be appropriately designed based on a known technique.

In order to perform this alignment, the second information conversion unit 17 may refer to the original network information to perform adjustment and regenerate the image. Subsequently, according to a comparison format (162), a road presence-absence determination unit 163 and a road width comparison unit 165 perform the comparison of the presence or absence of the road on the image, the road widths, the presence or absence of the lane, or the lane widths in the case where the comparison is made based on the road, and a lane presence-absence determination unit 164 and a lane width comparison unit 166 perform the comparison of the presence or absence of the road on the image, the road widths, the presence or absence of the lane, or the lane widths in the case where the comparison is made based on the lane.

In the comparison of the presence or absence of the lane and the comparison of the lane width, processing for recognizing the road may be performed based on the first road region and the second road region. In addition, processing for recognizing an end point and a width of the road may be performed after the road is recognized. Furthermore, processing for determining a correspondence relationship of roads between the road regions may be performed. These pieces of specific processing can be appropriately designed based on a known technique. This makes it possible to compare the presence or absence of the road or the width of the road.

The road presence-absence determination unit 163 determines the difference regarding the presence or absence of the road in the first road region and the second road region (both images in the following example). For example, in the case where the information about a certain road exists in one image while no information about the road corresponding to the other image, it is determined that the difference regarding the presence or absence of the road exists.

When the road information associated with both images exists, the road width comparison unit 165 compares the widths of the roads on the images, and obtains and outputs the difference in the widths. The output of the difference may be processed in consideration of a conversion error or the like in both data inputs, and the output unit may be the number of pixels or the number of lanes corresponding to the number of pixels.

The lane presence-absence determination unit 164 determines the difference regarding the presence or absence of the lane in the first road region and the second road region. When the lane information associated with both images exists, the lane width comparison unit 166 compares the widths of the lanes on the images, and obtains and outputs the difference in the widths.

The difference extraction unit 16 collectively sets these pieces of information as difference information, and transmits the difference information to the structure information verification unit 18. As described above, the difference information includes the difference presence-absence information indicating the presence or absence of the difference and the difference amount information indicating the difference amount. At this point, for example, the "presence or absence of difference" means whether the difference regarding the presence or absence of the road exists and whether the difference regarding the width of the road exists, and the "difference amount" means the magnitude of the difference regarding the difference of the width of the road.

For example, the unit outputting the difference may be a part of the road or the lane, a set of pixels on the image, the node or the link on the network, or the like. Hereinafter, the unit outputting the difference is referred to as a section. For example, the section is a section obtained by dividing the image on a predetermined reference (for example, into equal-sized squares). Furthermore, it is assumed that which part of the information in the original image information storage unit 10 or the map information storage unit 11 corresponds to the output section can be determined by following the conversion process so far.

Figure 5:
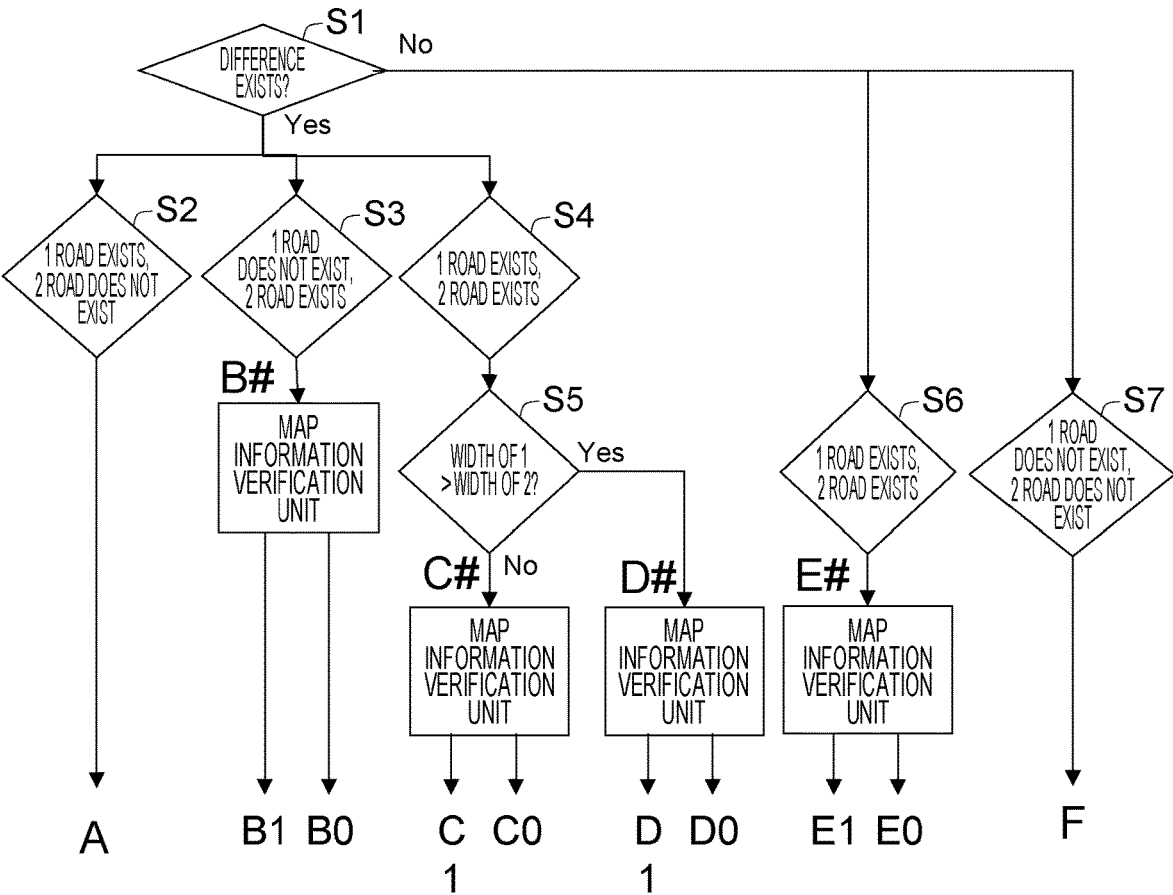
FIG. 5 is a view illustrating a map information verification unit.
Figure 5:
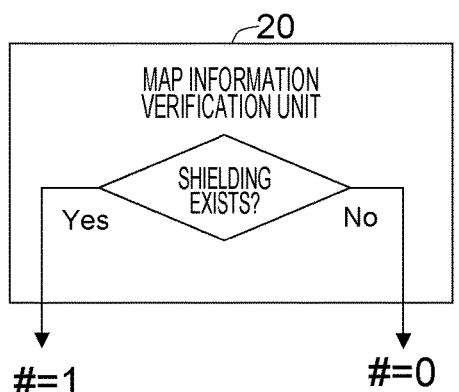

FIG. 5 illustrates a configuration of the structure information verification unit 18. In this example, the structure information verification unit 18 includes a map information verification unit 20.

The map information verification unit 20 classifies and outputs the type of the difference based on the comparison result of the difference extraction unit 16 and the structure information about the road or the lane. Hereinafter, although the function will be described focusing on the road, the road may be replaced with the lane. In the structure information verification unit 18, the map information verification unit 20 checks whether the shielding is generated in the target section.

Figure 11:
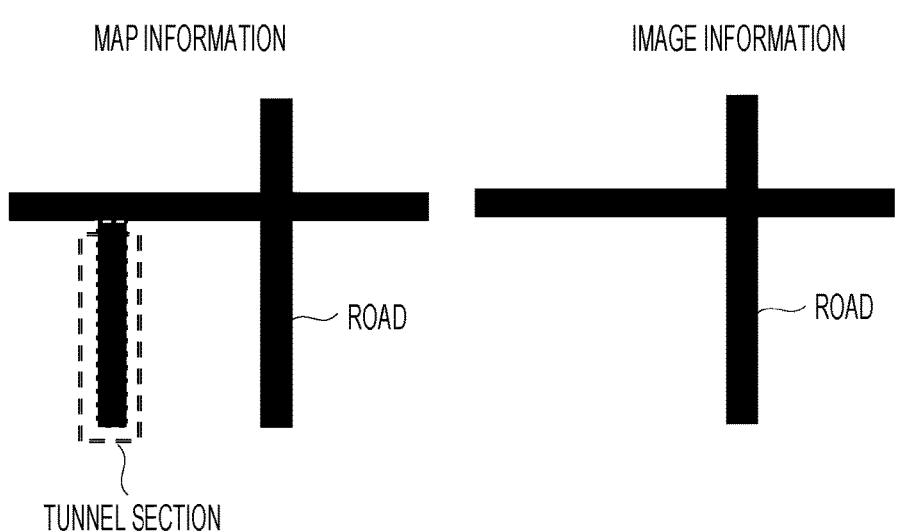
FIG. 11 is a view illustrating an example in which an output is different between map information and image information.

The map information verification unit 20 refers to the information about the corresponding map information storage unit 11 in the section in which the difference is obtained, and determines whether the shielded region exists (that is, whether the road is shielded by another structure). For example, as illustrated in FIG. 11, when the road is in a tunnel, the part is determined to be the shielding region. In addition, for example, when the road is a lower road relative to a junction or an expressway, the part is determined to be the shielding region. In a part where the roads three-dimensionally intersect, the shielding region may be determined in consideration of the widths of both roads.

In this case, 1 is output as a variable "#" in FIG. 5 when the shielding exists, and 0 is output as the variable "#" in FIG. 5 when the shielding does not exist. However, the value of the variable # may be set to a level in a stepwise manner according to a shielding degree or the like.

First, when the difference extraction unit 16 determines that the difference exists (Yes in S1), and when the road exists on the image given from the first information conversion unit 15 and when the road does not exist on the image given from the second information conversion unit 17 (S2), a signal A is output as a classification result.

When it is determined that the difference exists (Yes in S1), and when the road does not exist on the image given from the first information conversion unit 15 and when the road exists on the image given from the second information conversion unit 17 (S3), a signal B is output. In particular, the map information verification unit 20 outputs a signal B0 when the road regarding the difference is not shielded, and outputs a signal B1 when the road regarding the difference is shielded.

When it is determined that the difference exists (Yes in S1), and when the road exists on the image given from the first information conversion unit 15 and when the road exists also on the image given from the second information conversion unit 17 (S4), a signal C or D is output. That is, the case is the case where it is estimated that the number of lanes, the road width, and the like registered on the road are different although the road exists in both.

In this case, when the width (or the number of lanes) of the road observed on the image given from the first information conversion unit 15 is greater than that given from the second information conversion unit 17 (Yes in S5), the map information verification unit 20 outputs the signal D, and otherwise outputs the signal C (No in S5).

In particular, regarding the signal C, the map information verification unit 20 outputs a signal C0 when the road regarding the difference is not shielded, and outputs a signal C1 when the road regarding the difference is shielded. Similarly, for the signal D, the map information verification unit 20 outputs a signal D0 when the shielding does not exist for the road regarding the difference, and outputs a signal D1 when the shielding exists.

When the difference extraction unit 16 determines that the difference does not exist (No in S1), and outputs a signal E when the roads exist on both sides (S6). In particular, a signal E0 is output when the shielding does not exist, and a signal E1 is output when the shielding exists.

When the difference extraction unit 16 determines that the difference does not exist (No in S1), and outputs a signal F when the road does not exist on both sides (S7).

In this manner, the structure information verification unit 18 distinguishes and outputs the type of difference by checking the shielding status in the map of the section in which the difference exists.

Figure 10:
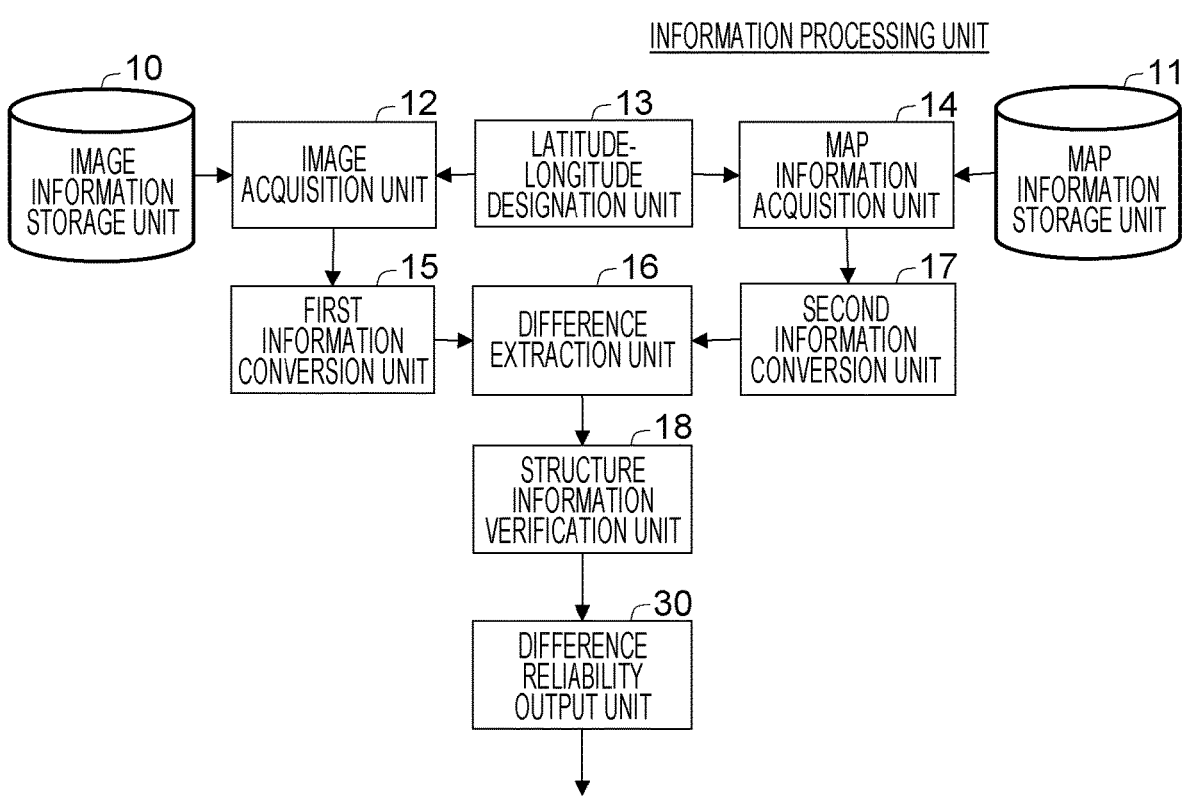
FIG. 10 is a view illustrating a configuration including a difference reliability output unit.

The information processing device may include a difference reliability output unit 30 as illustrated in FIG. 10, and the difference reliability output unit 30 may determine the reliability of the difference according to the result of the processing in FIG. 5.

FIG. 6 illustrates a relationship between the difference information and the reliability. The difference reliability output unit 30 outputs the reliability to each of the difference presence-absence information and the difference amount information. In the embodiment, the difference reliability output unit 30 determines the reliability based on the first road region, the second road region, and the presence or absence of the shielding. With such the configuration, the reliability is determined by appropriately considering the presence or absence of the shielding.

The reason why only A has the reliability of "medium" is that the data to be referred to does not exist on the side of the map information storage unit 11.

The data "-" indicates that the data to be updated does not exist because the difference does not exist. The reliability in the case where the shielding exists (B1, C1, D1, E1) is lower than the reliability in the case where the shielding does not exist (B0, C0, D0, E0). This is because road recognition from the image may be inaccurate due to the shielding.

Regarding the road recognition (processing based on the first road region) from the image, because a part of the road does not appear in the image when the shielding exists, there is a high possibility that the recognized road is narrower than the actual road, and there is a low possibility that the recognized road is wider than the actual road. For this reason, the reliability in the case of C1 is low, and the reliability in the case of D1 is high (higher than C1).

Figure 7:
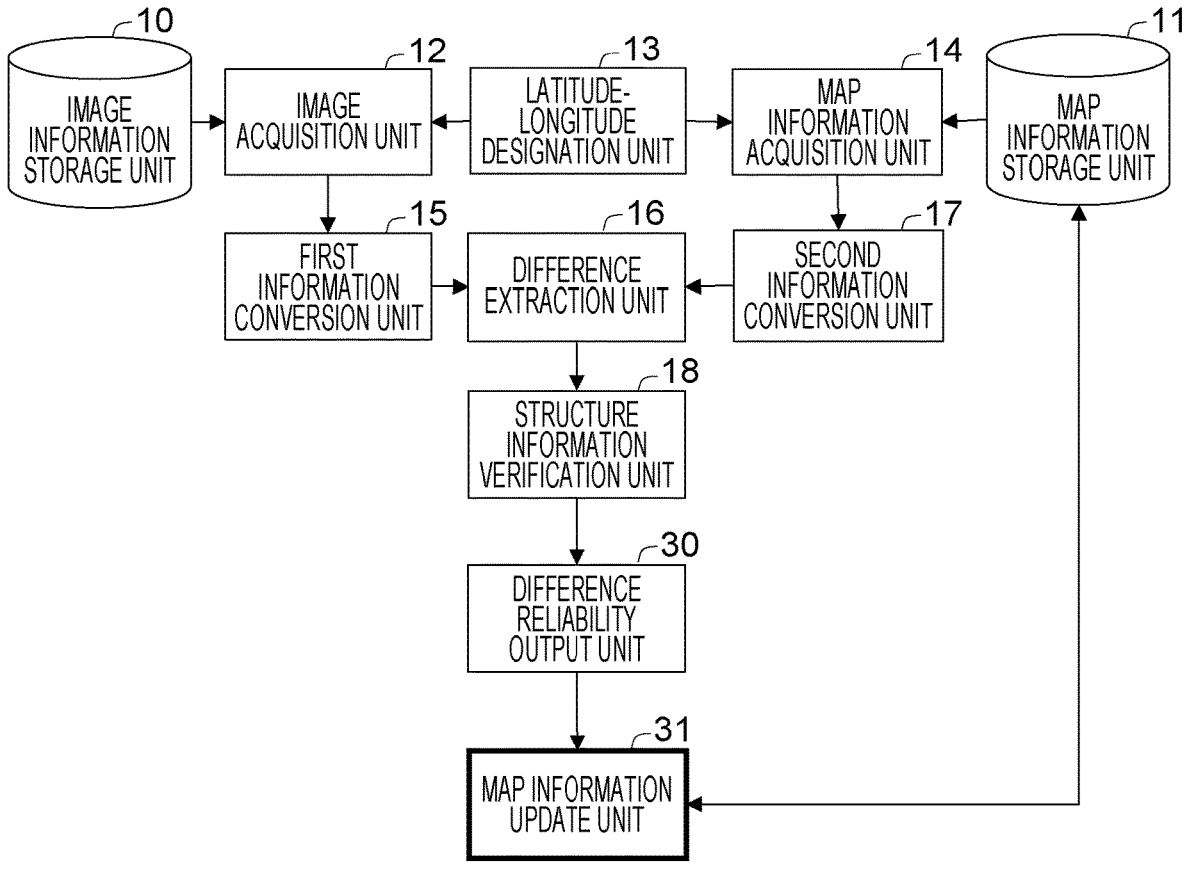
FIG. 7 is a view illustrating an information processing device including a map information update unit.

The information processing device may include a map information update unit 31 as illustrated in FIG. 7. The map information update unit 31 updates the map information about the map information storage unit 11 based on the difference information (for example, according to the results of the structure information verification unit 18 and the difference reliability output unit 30). More specifically, whether to update the map information is determined based on the reliability of the difference presence-absence information and the reliability of the difference amount information. Then, when it is determined to perform the update, the map information is updated. According to such the configuration, the map information can be appropriately updated.

In the embodiment, the map information is updated according to the classified results in FIGS. 5 and 6.

Although a reference example of the update will be described below, it is assumed that the data of the image information storage unit 10 is newer than the data of the map information storage unit 11. When the data in the image information storage unit 10 is older, the map information update unit 31 does not update the map information. However, as a modification, the update may be performed even when the data of the image information storage unit 10 is older. Furthermore, as another modification, the map information may be updated when freshness of the data is similar (for example, a time difference is within a predetermined range) or when the reliability of the map information is low. The "reliability of map information" may be determined by processing described later, or be determined using other appropriate reference.

First, an example of additionally registering whether the reliability is high for the presence or absence of information registered on the map will be described. In FIGS. 5 and 6, the map information update unit 31 may determine to update the map information in the case of A (that is, when the road exists in the first road region and the road corresponding to the second road region does not exist). As a specific example, information regarding the road may be added to the map information. In this way, when the new road is found by the image, the information can be reflected in the map information. As a modification, in the case of A, it may be determined that the map information is not updated.

For the cases of B0, C0, D0, D1 in which there is the high possibility that the presence or absence of the extracted difference is correct, information indicating that the reliability of the map information is low is added to the map. On the other hand, for B1, C1, E1 in which there is the high possibility that the extracted difference is incorrect, the reliability of the map information is not updated, or the information indicating that the reliability of the map information is high is added as the result of verification with the image information storage unit 10.

That is, the map information update unit 31 may determine not to update the map information when it is determined that the difference information is caused by the shielding of the road (B1) in the case where the road exists in the second road region and in the case where the road corresponding to the first road region (B) does not exist. On the other hand, when it is not determined that the difference information is caused by the shielding of the road (B0), it may be determined to update the map information. In this way, the map information can be appropriately updated in consideration of the presence or absence of the shielding.

When the road corresponding to both the first road region and the second road region exists (C1 and D1), the map information update unit 31 determines whether to update the map information (C1 or D1) based on the width of the road in the first road region and the width of the road in the second road region. In this way, the map information can be appropriately updated in consideration of the width of the road.

In the case of E0 and F, the update of the reliability is not required. In the case of E0, information indicating that the reliability of the map information is high is added as the result of the verification of the image information storage unit 10. Regarding A, it may be determined to update the map information, or the information indicating that the map information is not updated may be added because the road information to be updated does not exist on the map. Alternatively, with regarding A, for example, the information indicating that the reliability is low is given at a place where the road on which the difference appears and another road intersect. At this time, it is also conceivable to newly add the node or the link to an intersection of the network information to update the network information.

The case in which whether the reliability of the number of lanes or the lane width is high is additionally registered in the map information will be considered below. In this case, when the result of the reliability of the difference amount is high in FIG. 6, it is conceivable to consider that the reliability of the information registered on the map is low to give the result. In FIG. 6, when the reliability of the difference amount is low, it is considered that the information registered on the map is reliable, and the information indicating that the map information is not updated or the information indicating that the reliability is high is added.

In the above description, a mechanism determining the reliability of the map information from the reliability of the difference has been described. However, as a matter of course, the pieces of information A to F may be registered as the information representing the reliability of the map information as they are.

As described above, according to the information processing device of the embodiment, the shielding region of the road can be appropriately handled. For example, when the mechanism based on the presence or absence of the difference and the reliability of the output difference is taken, the map information can be updated while the shielding information that is a problem peculiar to the satellite image and the aerial photograph is considered.

Figure 3:
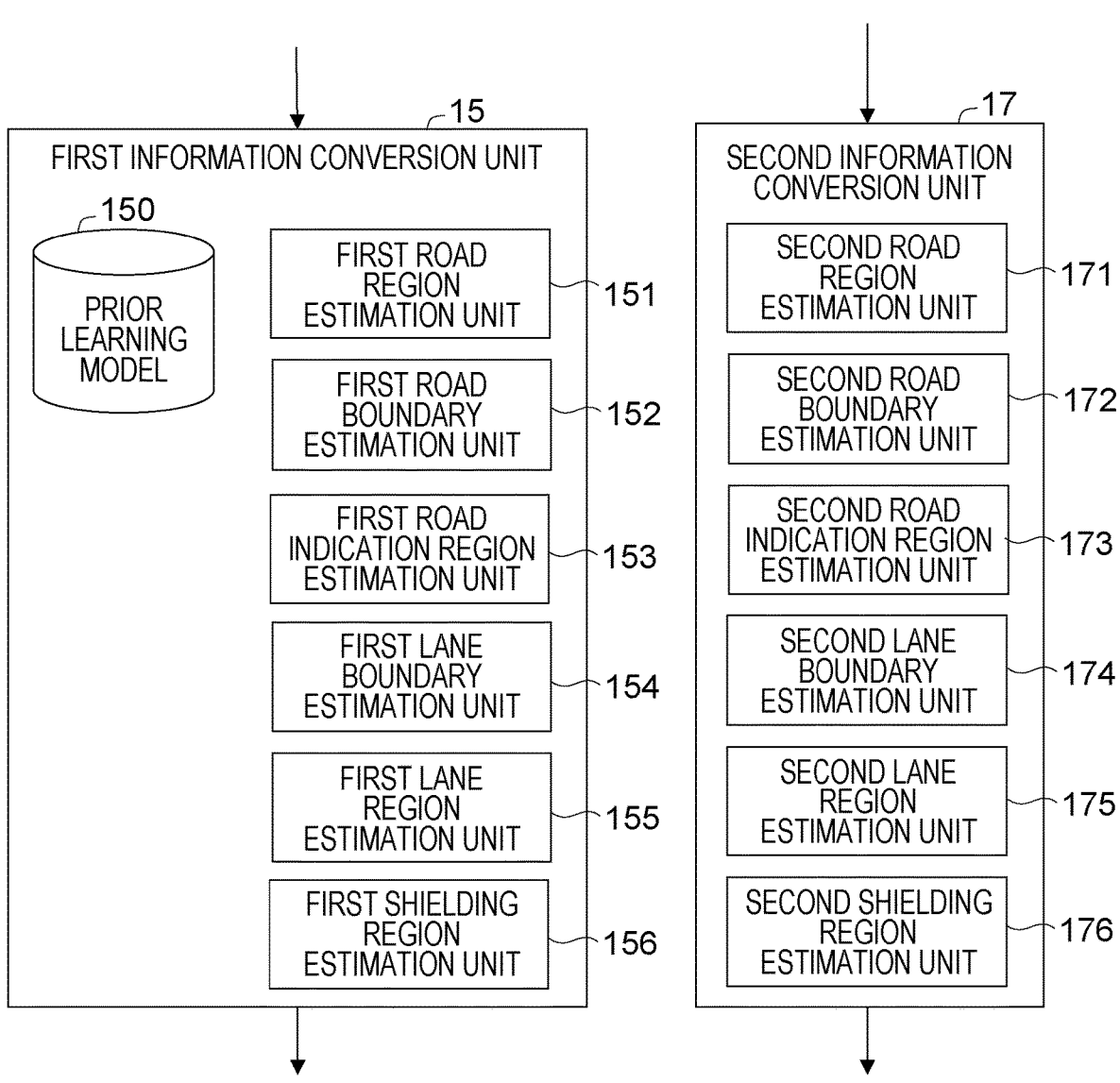
FIG. 3 is a view illustrating the information conversion unit including a shielding region estimation unit.

FIG. 3 illustrates a configuration in which a functional unit that estimates the shielding region is added to the first information conversion unit 15 and the second information conversion unit 17 in FIG. 2. The first information conversion unit 15 includes a first shielding region estimation unit 156, and the second information conversion unit 17 includes a second shielding region estimation unit 176.

The first information conversion unit 15 estimates first structure information based on the image using the first shielding region estimation unit 156. For example, the first structure information is information specifying a part (shielding region) in which the road is shielded in the image. Specific estimation processing can be appropriately designed based on a known technique or the like. In the estimation, the prior learning model 150 may estimate the road region shielded from a group of surrounding buildings or pattern information.

In the shielded region, there are the case where the structure other than the road, such as a building or a tree, is shielded and the case where the structure other than the road is shielded by another road, such as a road having a three-dimensional intersection or an expressway. For this reason, a plurality of attributes may be output for one pixel. For example, the attribute of the structure other than the road and the attribute of the shielded road may be output, or the attribute of the road and the attribute of the shielded road may be output.

In addition, the output that estimates a shielding cause such as the shielding by a building, the shielding by a tree, and the shielding by another road may be provided.

The second information conversion unit 17 causes the second shielding region estimating unit 176 to estimate second structure information based on the map information. For example, the second structure information is information specifying a part where the road shielding exists in the map information. The estimation may be performed by processing similar to that of the map information verification unit 20. In the embodiment, the difference extraction unit 16 obtains the difference of the road region instead of the difference of the shielding region.

Several differences exist in the shielding region estimated by the first shielding region estimating unit 156 and the second shielding region estimating unit 176. One is that the shielded region that can be estimated by the shielded region estimation unit of the first information conversion unit 15 tends to be a shorter distance or a narrower region than that estimated by the second information conversion unit 17. For example, the first information conversion unit 15 can estimate the shielding for the road in which a small part of the road is shielded, but cannot appropriately estimate shielding for the region in which most of the road is shielded, such as a long tunnel.

Figure 8:
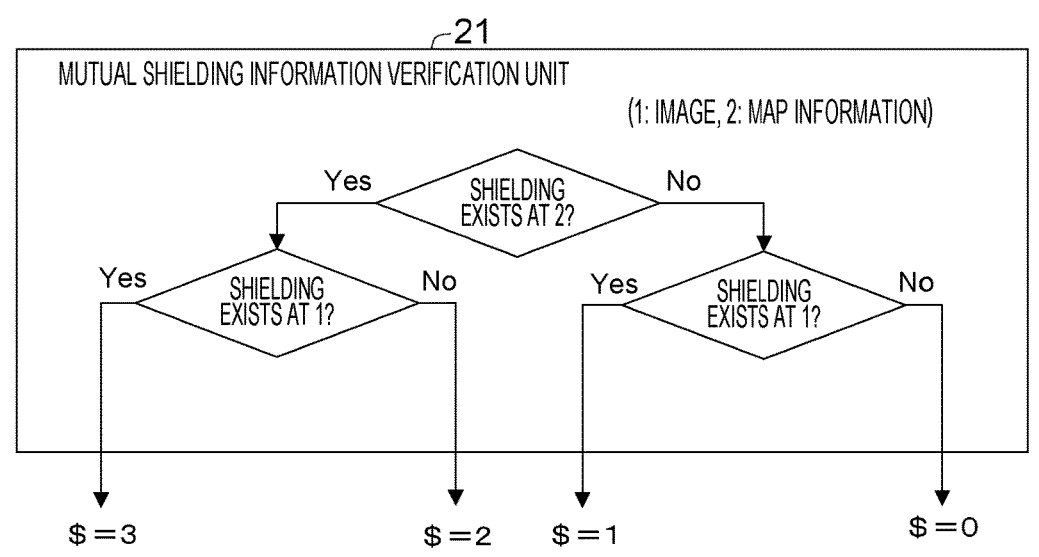
FIG. 8 is a view illustrating a mutual shielding information verification unit.

In the configuration including the first shielding region estimating unit 156 and the second shielding region estimating unit 176 as described above, for example, the configuration of the structure information verification unit 18 includes a mutual shielding information verification unit 21 in FIG. 8. The mutual shielding information verification unit 21 collates the first structure information with the second structure information to estimate a shielding situation.

As the variable "$" in FIG. 8, the mutual shielding information verification unit 21 outputs 3 when both the first structure information (image) and the second structure information (map information) are shielded, outputs 2 when only the map information is shielded, outputs 1 when only the image is shielded, and outputs 0 when both the image and the map information are not shielded. The meaning of the variable $ is similar to that of the variable # in FIG. 5, but the variable $ can take four values of 0 to 3. According to such the configuration, the shielding of each of the image and the map information can be considered.

In view of such characteristics, the structure information verification unit 18 verifies the reliability of the extracted difference region. As a specific example, when the difference is extracted by the difference extraction unit 16, a shielding possibility is determined, and the map information is not updated when the entire one of the roads is shielded. In addition, when only a part is shielded, the reliability of the difference is lowered. On the other hand, when it is determined that the shielding does not exist, the reliability of the difference is increased.

In the classification of A to F described above, in addition to whether the extracted difference is the presence or absence of the road, whether the reliability of the extracted difference is high or whether the difference amount is reliable is classified on the assumption that the shielding exists in the image information storage unit 10.

Similarly to FIG. 6, the reliability can be determined for the configuration in FIG. 8 as illustrated in FIG. 9. Regarding A, because the shielding information corresponding to the map side does not exist, A3 and A2 do not exist. Likewise, neither F3 nor F2 exists. The classified result may be used as the output of the difference reliability output unit 30 in FIG. 10.

The map information may be updated based on the reliability in FIG. 9. The specific processing at this time can be designed similarly to the example described in reference to FIG. 6.

An example in which only the information about the image information storage unit 10 is updated and collated after being updated with the configuration in FIG. 7 will be described with reference to FIG. 12. Here, it is assumed that the reliability of the map information is 0 to 3, and that the reliability of the map information is high when the value is large. The "reliability of map information" is different from the "reliability of difference" described above.

At this point, although the case where the data (image) of the image information storage unit 10 is newer than the data (map information) of the map information storage unit 11 is considered, the following processing is similarly applicable to other cases.

When it is determined that the difference does not exist (No in S11), the map information update unit 31 sets the reliability of the map information to 3. When it is determined that the difference exists (Yes in S11), the following processing is performed.

When it is determined that the reliability of the presence or absence of the difference is low (No in S12), the map information update unit 31 sets the reliability of the map information to 2. When it is determined that the reliability of the presence or absence of the difference is high (Yes in S12), the following processing is performed.

The map information update unit 31 refers to the previous reliability (that is, the reliability of the map information determined when the map information was updated last time). When the previous reliability is not designated (No in S13), the reliability of the map information is set to 1. When the previous reliability is 0 or 1 (Yes in S14), the reliability of the map information is set to 0. When the previous reliability is 2 or 3 (No in S14), the reliability of the map information is set to 1.

According to this example, the map information update unit 31 determines the reliability of the map information when the map information is updated. Then, the new reliability of the map information is determined based on the reliability of the map information determined when the map information was updated last time. For this reason, the reliability of the map information can be more appropriately determined based on the reliability of the difference, the reliability of the map information, and a history of the reliability of the map information. For example, the reliability of the map information is used as a criterion determining whether to update the map information, so that the map information can be updated more appropriately.

Subsequently, an example in which the data (map information) of the map information storage unit 11 is newer than the data (image) of the image information storage unit 10 will be described. The map information may be updated only for the node and the link in which the difference is generated from previous map information. In that case, it is conceivable to discard the previous difference information regarding the updated node and link and consider only the result of newly performing the collation.

Figure 12:
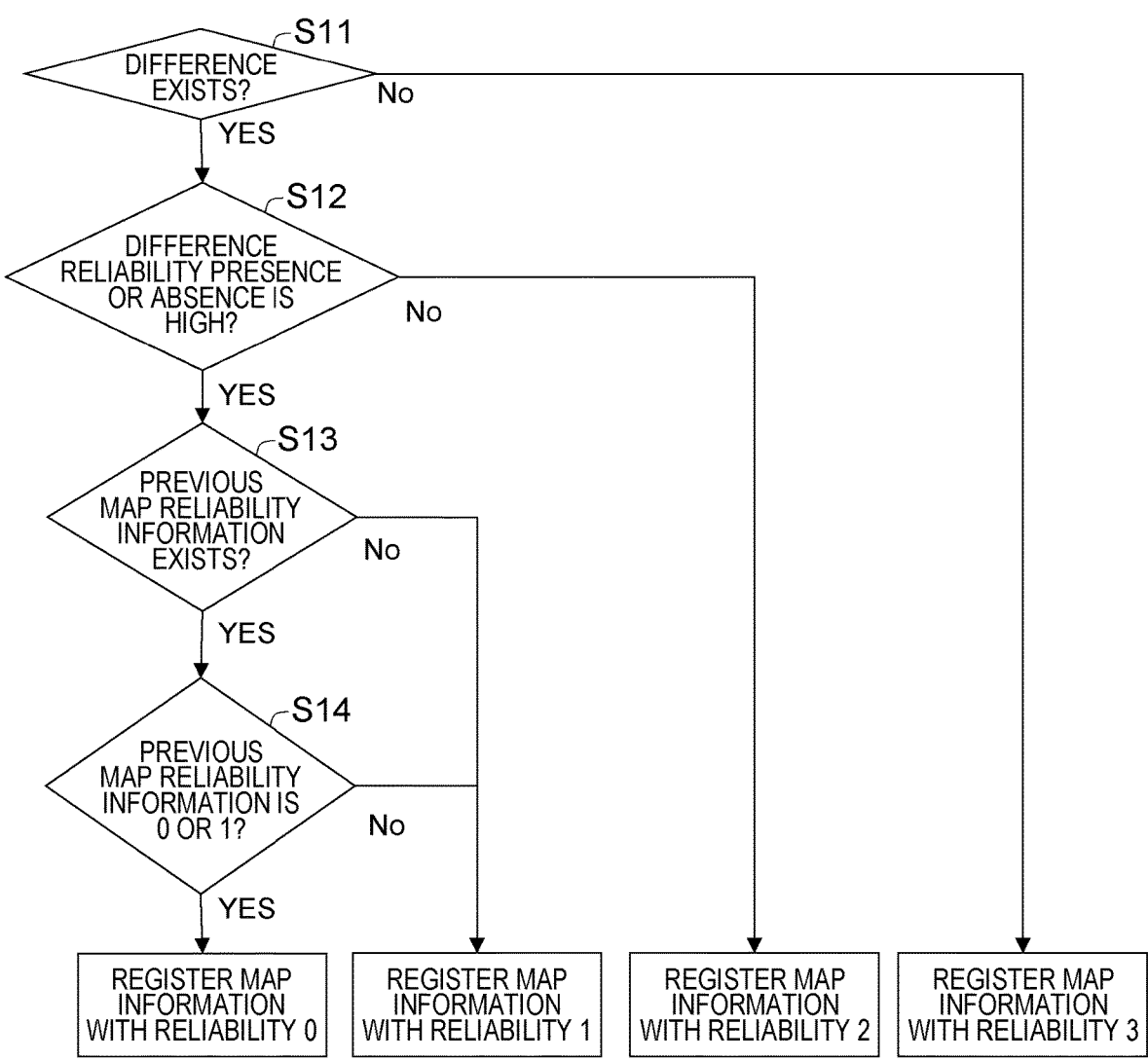
FIG. 12 is a view illustrating an example of a method for determining the reliability of the map information.

Finally, when the freshness of both pieces of data is the same (for example, when the pieces of data are updated at the same time), it is conceivable that the previous difference information is discarded to register a new comparison result for the node and the link part in which the map information is updated, and that an update rule in FIG. 12 is applied to other parts.

REFERENCE SIGNS LIST

15 first information conversion unit
16 difference extraction unit
17 second information conversion unit
18 structure information verification unit
30 difference reliability output unit
31 map information update unit
All publications, patents, and patent applications cited herein are hereby incorporated by reference in their entirety.

The invention claimed is:

1. An information processing device, comprising:
a first information conversion unit that estimates a first road region from an image obtained by imaging a road;
a second information conversion unit that estimates a second road region from map information stored in a map information storage unit; and
a difference extraction unit that extracts difference information indicating a difference between the first road region and the second road region;
a difference reliability output unit that determines reliability of the difference information; and
a map information update unit that determines whether to update the map information based on the difference information,
wherein the difference information includes difference presence-absence information indicating presence or absence of the difference and difference amount information indicating a difference amount,
the difference reliability output unit outputs reliability for each of the difference presence-absence information and the difference amount information,
the map information update unit determines whether to update the map information based on the reliability of the difference presence-absence information and the reliability of the difference amount information, and
the difference reliability output unit determines the reliability of the difference presence-absence information and the reliability of the difference amount information based on a predetermined correspondence between (i) a combination of whether the difference is present or not, whether a road exists in the first road region or in the second road region, and whether shielding of the road exists, and (ii) the reliability.

2. The information processing device according to claim 1, wherein the map information update unit determines reliability of the map information when the map information is updated.

3. The information processing device according to claim 2, wherein the map information update unit determines the reliability of the map information based on the reliability of the map information determined when the map information is updated last time.

4. The information processing device according to claim 1, comprising a structure information verification unit that collates first structure information and second structure information, wherein the first information conversion unit estimates the first structure information based on the image, and the second information conversion unit estimates the second structure information based on the map information.

5. The information processing device according to claim 1, wherein the map information update unit determines to update the map information when a road exists in the first road region and when a road corresponding to the second road region does not exist.

6. An information processing device, comprising:

a first information conversion unit that estimates a first road region from an image obtained by imaging a road;

a second information conversion unit that estimates a second road region from map information stored in a map information storage unit;

a difference extraction unit that extracts difference information indicating a difference between the first road region and the second road region;

a difference reliability output unit that determines reliability of the difference information; and a map information update unit that determines whether to update the map information based on the difference information, wherein when a road exists in the second road region and when a road corresponding to the first road region does not exist, the map information update unit determines not to update the map information when it is determined that the difference information is generated by shielding of the road, and determines to update the map information when it is not determined that the difference information is generated by the shielding of the road.

7. An information processing device, comprising:

a first information conversion unit that estimates a first road region from an image obtained by imaging a road;

a second information conversion unit that estimates a second road region from map information stored in a map information storage unit;

a difference extraction unit that extracts difference information indicating a difference between the first road region and the second road region;

a difference reliability output unit that determines reliability of the difference information; and a map information update unit that determines whether to update the map information based on the difference information, wherein the map information update unit determines whether to update the map information further based on a width of a road in the first road region and a width of a road in the second road region when a road corresponding to both the first road region and the second road region exists.

* * * * *